US012693556B2

(12) United States Patent
Huang et al.

(10) Patent No.: US 12,693,556 B2
(45) Date of Patent: Jul. 28, 2026

(54) INTEGRATED PHOTODETECTOR WITH EMBEDDED SEMICONDUCTOR REGION

(71) Applicant: Taiwan Semiconductor Manufacturing Company, Ltd., Hsinchu (TW)

(72) Inventors: Tai-Chun Huang, New Taipei City (TW); Stefan Rusu, Sunnyvale, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 348 days.

(21) Appl. No.: 18/314,176

(22) Filed: May 9, 2023

(65) Prior Publication Data

US 2024/0377661 A1     Nov. 14, 2024

(51) Int. Cl.
G02F 1/025      (2006.01)
G02B 6/132      (2006.01)
G02B 6/12       (2006.01)

(52) U.S. Cl.
CPC ............. G02F 1/025 (2013.01); G02B 6/132 (2013.01); *G02B 2006/12083* (2013.01); *G02B 2006/12142* (2013.01)

(58) Field of Classification Search
CPC ...................................................... G02F 1/025
See application file for complete search history.

(56) References Cited

U.S. PATENT DOCUMENTS

| | | | |
|---|---|---|---|
| 10,146,070 B2 | 12/2018 | Fujikata et al. | |
| 11,073,738 B2 | 7/2021 | Mekis et al. | |
| 2003/0223672 A1* | 12/2003 | Joyner ............... | G02B 6/12016 385/14 |
| 2012/0263410 A1* | 10/2012 | Feng ..................... | G02B 6/125 385/14 |
| 2015/0117808 A1* | 4/2015 | Chen .................. | G02B 6/29323 385/2 |
| 2015/0293384 A1 | 10/2015 | Ogawa et al. | |
| 2017/0040469 A1 | 2/2017 | Alloatti | |
| 2017/0062636 A1 | 3/2017 | Ram et al. | |
| 2018/0024410 A1* | 1/2018 | Fujikata .................. | G02F 1/025 385/3 |
| 2018/0212080 A1 | 7/2018 | Meyer et al. | |

(Continued)

*Primary Examiner* — Chad H Smith

(74) *Attorney, Agent, or Firm* — Eschweiler & Potashnik, LLC

(57)          ABSTRACT

In some embodiments, the present disclosure provides an optical module. A waveguide includes a rib, and further includes a first protrusion and a second protrusion respectively on opposite sides of the rib. Further, the waveguide is formed of a first semiconductor material. A photodetector is in the waveguide and comprises a PN junction in the rib. A P type region of the PN junction extends to the first protrusion, and an N type region of the PN junction extends to the second protrusion. Further, the first and second protrusions accommodate heavily doped P and N type contact regions. A semiconductor region is on the PN junction. The semiconductor region comprises a second semiconductor material different the first semiconductor material. For example, the second semiconductor material may have a smaller bandgap than the first semiconductor material to enhance quantum efficiency.

20 Claims, 18 Drawing Sheets

100a

(56) References Cited

U.S. PATENT DOCUMENTS

| | | |
|---|---|---|
| 2018/0373067 A1 | 12/2018 | Fujikata |
| 2020/0124878 A1 | 4/2020 | Yu et al. |
| 2021/0294177 A1 | 9/2021 | Nakata et al. |
| 2022/0011408 A1 | 1/2022 | Sakib et al. |

* cited by examiner

300a

300b

300i

300j

400

600a

700

702

106

102

800

802

702

106

102

1100

1200

2100 ⬊

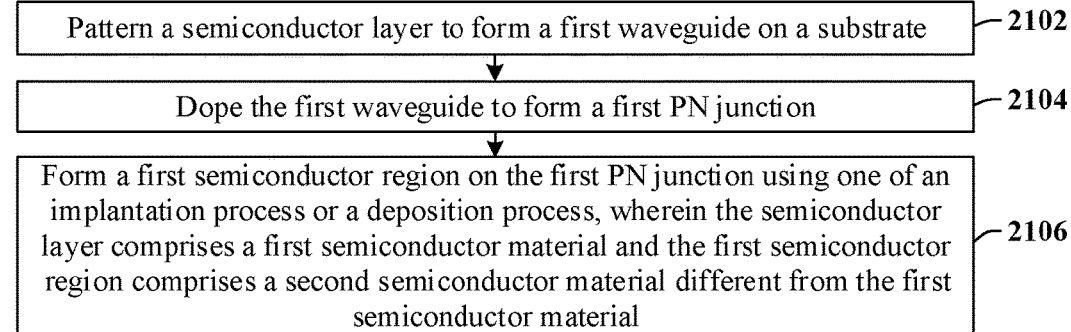

Pattern a semiconductor layer to form a first waveguide on a substrate — 2102

Dope the first waveguide to form a first PN junction — 2104

Form a first semiconductor region on the first PN junction using one of an implantation process or a deposition process, wherein the semiconductor layer comprises a first semiconductor material and the first semiconductor region comprises a second semiconductor material different from the first semiconductor material — 2106

Fig. 21

INTEGRATED PHOTODETECTOR WITH EMBEDDED SEMICONDUCTOR REGION

BACKGROUND

At high frequencies or high data rates, electrical transmission is reaching its limit due to high energy loss over long distances. As such, electrical chips that depend on long distance transmission are turning to optical transmission. Such electrical chips may, for example, include switch chips or system-on-chip (SoC) chips. Such SoC chips may, for example, include application-specific integrated circuit (ASIC) chips, central processing unit (CPU) chips, graphics processing unit (GPU) chips, and so on.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 21 illustrates a block diagram of some embodiments of the method of FIGS. 7-20 to 20.

DETAILED DESCRIPTION

Figure 1A:
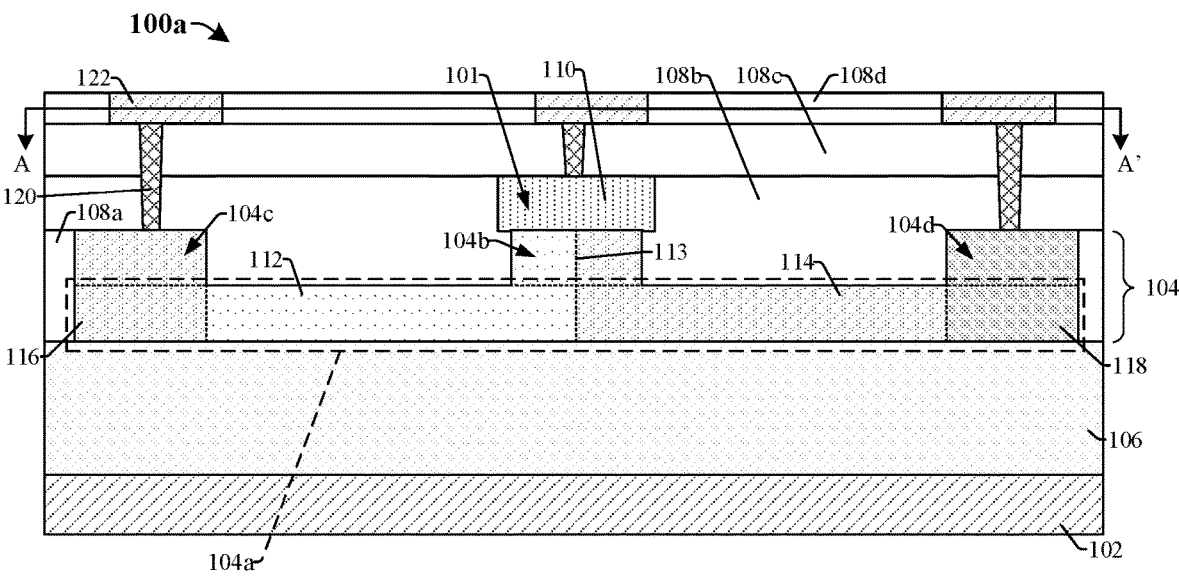
FIGS. 1A-1B illustrate a cross-sectional view and a top layout view, respectively, of some embodiments of an optical module comprising a photodetector integrated with a ribbed waveguide.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An optical module may comprise a waveguide and a photodetector. The waveguide passes an optical signal to the photodetector, which generates an electrical signal based on the optical signal. Conventionally, some photodetectors designed to function with both optical circuits and electronic circuits use a flip-chip method of integration, where optical circuits and electronic circuits are fabricated on separate chips before the circuits are bonded together using solder bumps. However, the flip-chip method of integration depends on precise alignment between the chips being bonded in order to effectively pass signals between the two chips. Chips used in flip-chip bonding additionally have a minimum area to support the coupling and separation of individual solder bumps. Therefore, a single chip solution is desirable to reduce the area used by the photodetector, enhance the flexibility of designs, and mitigate the risks associated with misalignment between chips.

Various embodiments of the present disclosure relate to an optical module comprising a photodetector integrated into a ribbed waveguide. In some embodiments, the optical module comprises the ribbed waveguide, where a portion of the ribbed waveguide is divided into a P-type region and an N-type region. The P-type region and the N-type region form a PN junction approximate to a center of the ribbed waveguide. Further, a biasing circuit is coupled to first and second protrusions extending from the P-type region and the N-type region, respectively. The biasing circuit reverse biases the PN junction, widening a depletion region proximate to the center of the ribbed waveguide. Due to the photoelectric effect, photons traveling through the ribbed waveguide may enter the depletion region and generate carriers. The carriers generated in the depletion region are prevented from recombining by the electric field present across the PN junction, which then pulls the carriers towards separate protrusions (e.g., the first and second protrusions) and into the biasing circuit, creating a measurable current.

The integration of a photodetector into the ribbed waveguide increases the flexibility of designs utilizing both photonic and electronic circuits. For example, a device that uses photonic circuits for high speed and/or long distance communications between different chips may convert the photonic signal to an electronic signal without using more than one chip, mitigating or removing issues related to chip bonding, alignment, and minimum space requirements.

Figure 1B:
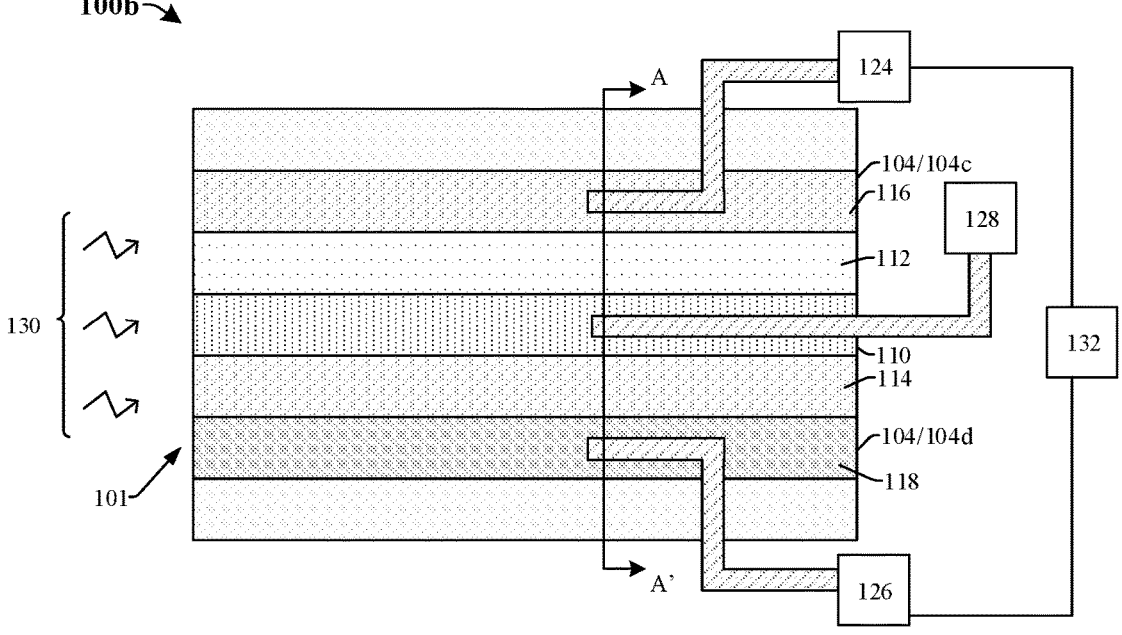

FIGS. 1A-1B illustrate a cross-sectional view 100a and a top layout view 100b, respectively, of some embodiments of an optical module comprising a photodetector 101 integrated with a ribbed waveguide 104.

FIG. 1A shows the ribbed waveguide 104 extending over a handle substrate 102. An insulative layer 106 separates the ribbed waveguide 104 from the handle substrate 102. The handle substrate 102, the insulative layer 106, and the ribbed waveguide 104 may comprise layers of a silicon-on-insulator (SOI) substrate. The ribbed waveguide 104 is surrounded by a plurality of dielectric layers 108a-108d and comprises a slab 104a. A rib 104b extends from a center of the slab 104a. A first protrusion 104c and a second protrusion 104d extend from the slab 104a, on opposite sides of the rib 104b.

In some embodiments, the rib 104b may be regarded as a central rib, and the first protrusion 104c and the second protrusion 104d may be regarded as peripheral ribs.

A first-doping-type region 112 extends from the first protrusion 104c to the rib 104b, and a second-doping-type region 114 extends from the second protrusion 104d to the rib 104b. In some embodiments, the first-doping-type region 112 is a P-type region and the second-doping-type region 114 is an N-type region. In other embodiments, the first-doping-type region 112 is an N-type region and the second-doping-type region 114 is a P-type region. The first-doping-type region 112 and the second-doping-type region 114 form a PN junction 113 extending through the slab 104a and the rib 104b. In some embodiments, the PN junction 113 is approximately at a midpoint between outer sidewalls of the rib 104b and/or at a center between the first protrusion 104c and the second protrusion 104d.

A semiconductor region 110 is on the PN junction 113. In some embodiments, the semiconductor region 110 may be regarded as a semiconductor cap or the like. The ribbed waveguide 104 comprises a first semiconductor material, such as monocrystalline silicon or the like. The semiconductor region 110 comprises a second semiconductor material, such as germanium (Ge), or a III-V semiconductor material, such as gallium arsenide (GaAs), indium arsenide (InAs), gallium nitride (GaN), indium phosphide (InP), or the like. The second semiconductor material has a higher absorption coefficient for target radiation than the first semiconductor material and may, for example, have a higher electron mobility and/or differing bandgap energies relative to the first semiconductor material. In some embodiments, the semiconductor region 110 is devoid of a P-type doping and an N-type doping, whereby the semiconductor region 110 may be regarded as intrinsic.

The use of the second semiconductor material in the semiconductor region 110 may increase the quantum efficiency of the photodetector 101 over the desired range of wavelengths. For example, use of germanium or silicon germanium for the semiconductor region 110 may improve quantum efficiency for near infrared radiation due to a narrow bandgap relative to silicon. This increase in the quantum efficiency leads to a proportional increase in the electronic output signal of the photodetector 101 for the same photonic input signal. An increased output signal reduces the effect of noise on the output, which in turn may result in less errors and a more accurate data transfer between the photonic and electronic circuits.

In some embodiments, the semiconductor region 110 corresponds to a free carrier concentration modulation peak of the photodetector 101. Further, in some embodiments, a location at both a height-wise center of the ribbed waveguide 104 and a width-wise center of the ribbed waveguide 104 corresponds to a peak of a photoelectric field during use of the photodetector 101. Therefore, because a bottom surface of the semiconductor region 110 is elevated relative to a top surface of the ribbed waveguide 104, the carrier modulation peak is above the peak of the photodetector field in some embodiments.

A first heavily doped region 116 is in the first protrusion 104c. The first heavily doped region 116 has the same doping type as the first-doping-type region 112, but has a greater concentration of dopants. A second heavily doped region 118 is in the second protrusion 104d. The second heavily doped region 118 has the same doping type as the second-doping-type region 114, but has a greater concentration of dopants. In some embodiments, the first-doping-type region 112 and the second-doping-type region 114 have doping concentrations approximately between 2e16 to 9e18 atoms/cm$^3$, approximately between 2015 to 9e17 atoms/cm$^3$, approximately between 2e17 to 9e19 atoms/cm$^3$, or the like. In further embodiments, the first heavily doped region 116 and the second heavily doped region 118 have doping concentrations approximately between 1e18 and 9e20 atoms/cm$^3$, approximately between 1e17 and 9e19 atoms/cm$^3$, approximately between 1e19 and 9e21 atoms/cm$^3$, or the like. In some embodiments, the first heavily doped region 116 and the first-doping-type region 112 overlap in a portion of the slab 104a. The second-doping-type region 114 and the second heavily doped region 118 may also overlap in a portion of the slab 104a.

Contacts 120 are coupled to the first protrusion 104c, the second protrusion 104d, and the semiconductor region 110. The contacts 120 connect the first protrusion 104c, the second protrusion 104d, and the semiconductor region 110 to a wire layer 122.

FIG. 1B shows the wire layer 122 connecting the first protrusion 104c to a first pad 124, the second protrusion 104d to a second pad 126, and the semiconductor region 110 to a third pad 128. Note that the plurality of dielectric layers 108a-108d are not shown in FIG. 1B to better show the photodetector 101. The first pad 124 and the second pad 126 are electrically coupled to a bias circuit 132 and, in some embodiments, the third pad 128 is electrically grounded. The bias circuit 132 reverse biases the PN junction 113, thereby increasing the area of a depletion region that extends across the PN junction 113. A photonic signal 130 is shown traveling through the ribbed waveguide 104 towards the photodetector 101, where the photonic signal 130 generates carriers in the depletion region. The reverse biasing of the PN junction 113 further provides an electric field to pull the generated carriers from the ribbed waveguide 104 towards an electronic circuit (not shown) coupled to the photodetector 101.

The integration of the photodetector 101 into a single chip capable of holding a photonic circuit and an electronic circuit increases the flexibility of designs utilizing both photonic and electronic circuits, mitigating or removing issues related to chip bonding, alignment, and minimum area requirements of bonded chips.

Figure 2A:
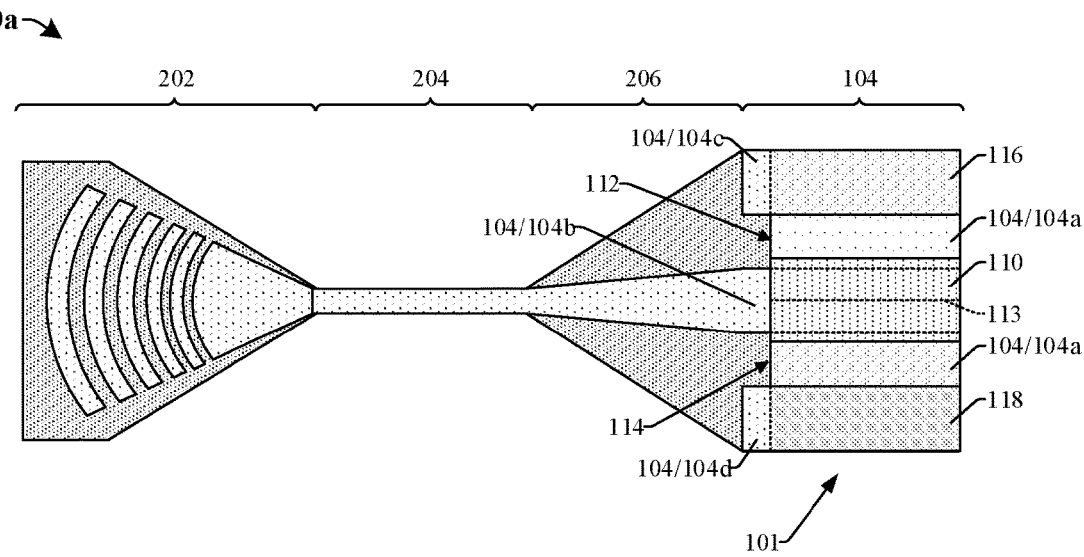
FIGS. 2A-2B illustrate some top layout views of various embodiments of an optical coupler connecting to a photodetector.
Figure 2B:
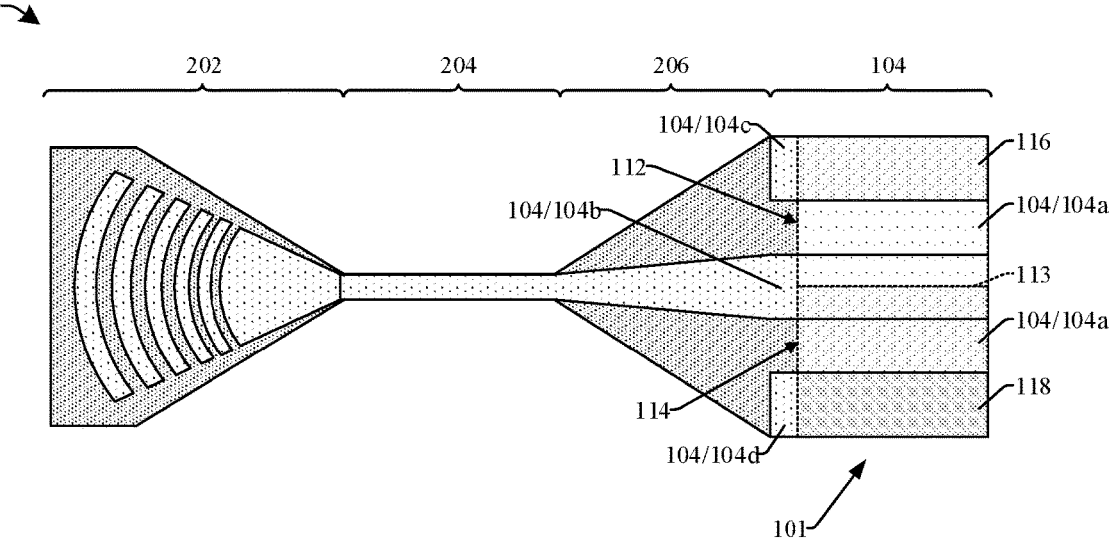

FIGS. 2A-2B illustrate some top layout views 200a-200b of various embodiments of an optical coupler 202 connecting to a photodetector 101. In FIG. 2A, the photodetector 101 may, for example, be as in FIGS. 1A and 1B. In FIG. 2B, the photodetector 101 may, for example, be as in FIGS. 1A and 1B except that the semiconductor region 110 is omitted.

The optical coupler 202 is coupled to the ribbed waveguide 104 by a strip waveguide 204 and a transition waveguide 206. The optical coupler 202 may, for example, be a grating coupler, an edge coupler, or the like. At the transition waveguide 206, a width of the transition waveguide 206 increases from a width of the strip waveguide 204 to a width of the rib 104b of the ribbed waveguide 104. Further, the slab 104a transitions from having a width of the strip waveguide 204 to having a width of the ribbed waveguide 104. One or more additional photonic circuit components (e.g., a power spreader, a Mach-Zehnder modulator (MZM), or the like) may, for example, be coupled to the strip waveguide 204 or the ribbed waveguide 104.

The PN junction 113 is at the rib 104b, formed by the first-doping-type region 112 and the second-doping-type region 114. The first-doping-type region 112 and the second-doping-type region 114 extend from the PN junction 113 respectively to the first protrusion 104c and the second protrusion 104d. Further, the first protrusion 104c and the second protrusion 104d respectively accommodate the first heavily doped region 116 and the second heavily doped region 118. Focusing on FIG. 2A, and in contrast with FIG. 2B, the semiconductor region 110 overlaps with the rib 104b and the PN junction 113.

FIGS. 3A-3J illustrate some cross-sectional views 300a-300j of alternative embodiments of the optical module of FIG. 1A.

Photons entering the ribbed waveguide 104 may be represented by an electromagnetic field traveling along the ribbed waveguide 104. The magnitude of the electromagnetic field is highest near the center of the ribbed waveguide 104. The square of the magnitude of the electromagnetic field is proportional to the number of photons concentrated in that position. Therefore, the highest concentration of photons in the ribbed waveguide 104 is at the center of the ribbed waveguide 104, which is approximately at a width-wise center of the rib 104b and is approximately at a height-wise center of the ribbed waveguide 104. Efforts to increase the efficiency of carrier generation (e.g., quantum efficiency) are therefore focused on the center of the ribbed waveguide as described hereafter with regard to FIGS. 3A-3J.

Figure 3A:
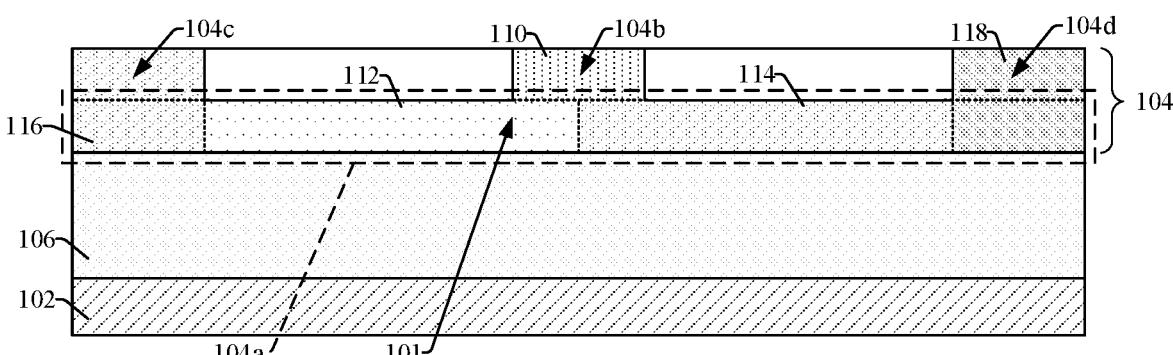
FIGS. 3A-3J illustrate some cross-sectional views of alternative embodiments of the optical module of FIG. 1A.

As shown in the cross-sectional view 300a of FIG. 3a, the semiconductor region 110 is implanted into the rib 104b of the ribbed waveguide 104. In other words, the second semiconductor material is implanted into the rib 104b. Therefore, the semiconductor region 110 comprises both the first semiconductor material and the second semiconductor material. For example, to the extent that the first semiconductor material is or comprises silicon and the second semiconductor material is or comprises germanium, the semiconductor region 110 may be or comprise silicon germanium. Other suitable materials are, however, amenable. In some embodiments, the semiconductor region 110 has a doping concentration of the second semiconductor material approximately between 1e18 to 9e25 atoms/cm$^3$.

During use of the photodetector 101, electromagnetic field traveling along the ribbed waveguide 104 may enter the semiconductor region 110. As noted above, the second semiconductor material of the semiconductor region 110 may have a higher absorption coefficient for incident radiation than the first semiconductor material and may therefore enhance quantum efficiency. In other words, the second semiconductor material increases the number of carriers generated and converted to photoelectric current. Because the semiconductor region 110 is implanted into the rib 104b, the semiconductor region 110 overlaps with a center of the ribbed waveguide 104. Further, because the concentration of photons is highest towards the center of the ribbed wave-guide 104, greater quantum efficiency is achieved.

In some embodiments, the semiconductor region 110 corresponds to a free carrier concentration modulation peak of the photodetector 101. Further, in some embodiments, the center of the ribbed waveguide 104 corresponds to a peak of a photoelectric field during use of the photodetector 101. Therefore, because the semiconductor region 110 is at the center of the ribbed waveguide 104, the carrier modulation peak is coincident with the peak of the photodetector field in some embodiments.

Figure 3B:
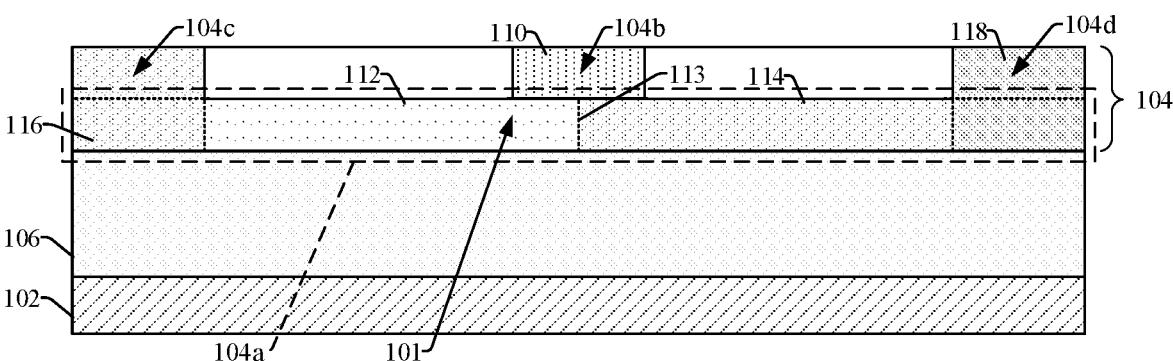

As shown in the cross-sectional view 300b of FIG. 3B, the rib 104b of the ribbed waveguide 104 is instead replaced with the semiconductor region 110 deposited over the PN junction 113. Depositing the semiconductor region 110 may, for example, provide a greater concentration of the second semiconductor material above the PN junction 113 than implanting the material in the ribbed waveguide 104. Therefore, depositing the semiconductor region 110 may increase the quantum efficiency further at a position approximately coinciding with a peak of the electromagnetic field in the ribbed waveguide 104, thereby increasing the magnitude of the electrical output signal further.

Figure 3C:
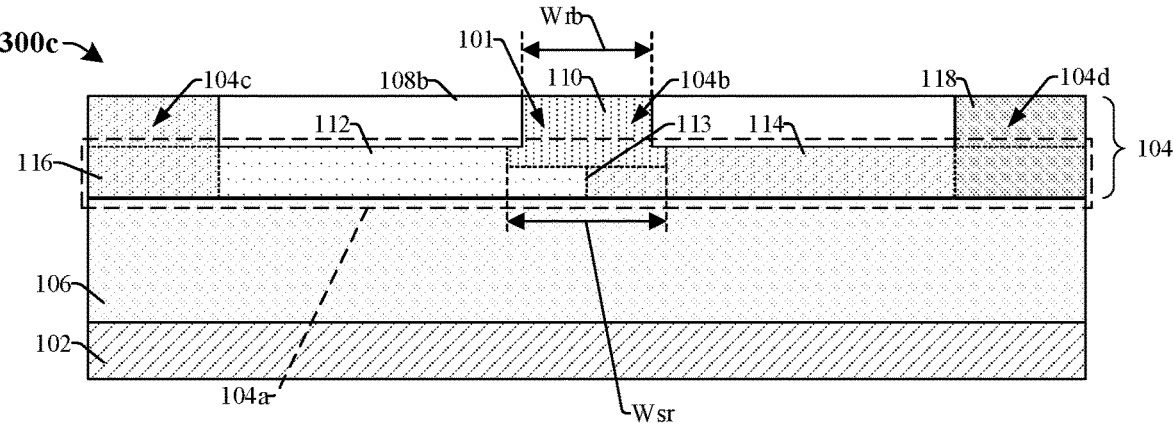

As shown in the cross-sectional view 300c of FIG. 3C, the semiconductor region 110 extends into the slab 104a of the ribbed waveguide 104, substantially coinciding with a center of the ribbed waveguide 104. The implanted second semi-conductor material covers a greater area at the center of the ribbed waveguide 104, coinciding with a peak of the electromagnetic field in the ribbed waveguide 104, increasing the efficiency of the photodetector 101. In some embodi-ments, a width Wsr of the semiconductor region 110 is about 100-350 percent of a width Wrb of the rib 104b. Other suitable percentages are, however, amenable.

Figure 3D:
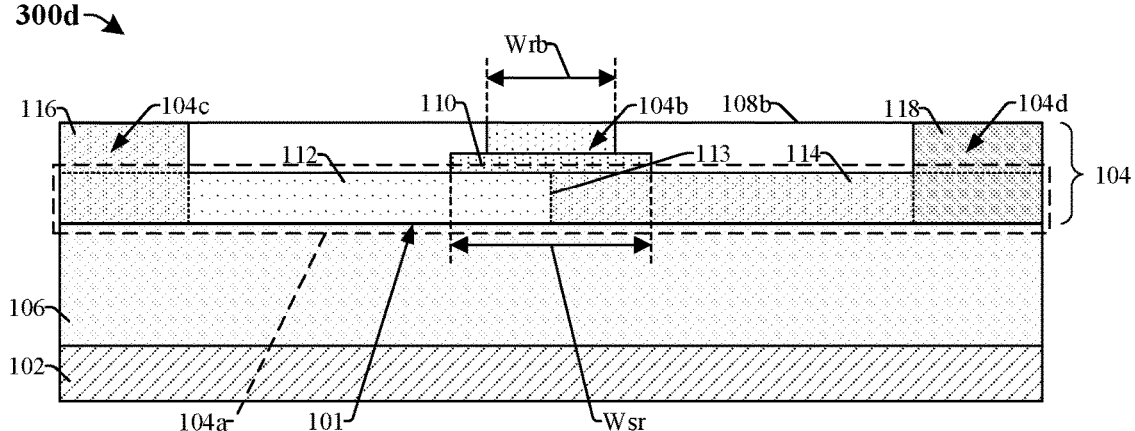

As shown in the cross-sectional view 300d of FIG. 3D, the semiconductor region 110 is deposited directly onto the slab 104a, and a polysilicon substitute for the rib 104b is directly over the semiconductor region 110. The configuration shown provides the more concentrated second semiconduc-tor material of the deposited semiconductor region 110 in a position closer to the center of the ribbed waveguide 104 than the position of the semiconductor region 110 in the embodiment shown in FIG. 1A, which may lead to better quantum efficiency. In some embodiments, a width Wsr of the semiconductor region 110 is about 100-350 percent of a width Wrb of the rib 104b. Other suitable percentages are, however, amenable.

Figure 3E:
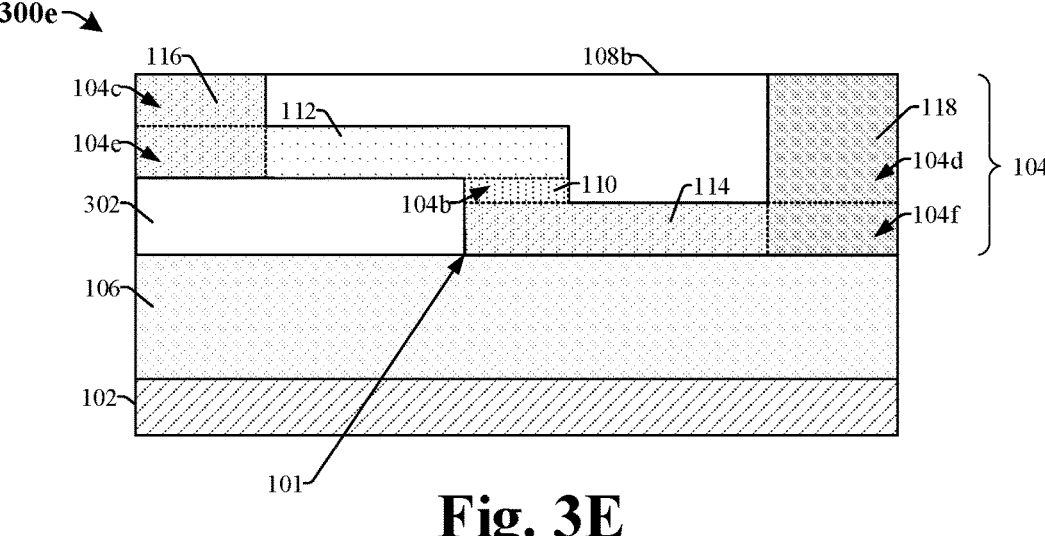

As shown in the cross-sectional view 300e of FIG. 3E, the semiconductor region 110 is centered on the rib 104b between a lower slab 104f and an upper slab 104e. The upper slab 104e extends over the semiconductor region 110, and has a lower surface above an upper surface of the lower slab 104f. The first protrusion 104c extends from the upper slab 104e, and the second protrusion 104d extends from the lower slab 104f. The first protrusion 104c and the second protrusion 104d have upper surfaces that are level with one another.

The first-doping-type region 112 is in the upper slab 104e and extends to an upper boundary of the semiconductor region 110, and the second-doping-type region 114 is in the lower slab 104f and extends to a lower boundary of the semiconductor region 110. The first-doping-type region 112, the semiconductor region 110, and the second-doping-type region 114 together result in a PIN junction or the like.

In some embodiments, a fill layer 302 separates the upper slab 104e from the insulative layer 106. In some embodi-ments, the fill layer 302 is or comprises silicon oxide and/or the like. In some embodiments, the upper slab 104c is or comprises polysilicon and/or the like, whereas the lower slab 104f is or comprises monocrystalline silicon and/or the like.

The semiconductor region 110 is directly between the first-doping-type region 112 and the second-doping-type region 114 in a center of the ribbed waveguide 104. The greatest concentration of photons passes through the ribbed waveguide 104 at the position of the semiconductor region 110, so an increase to the quantum efficiency of the photo-detector 101 at this point results in a greater change in quantum efficiency. The semiconductor region 110 may be either implanted or deposited before formation of the upper slab 104c.

Figure 3F:
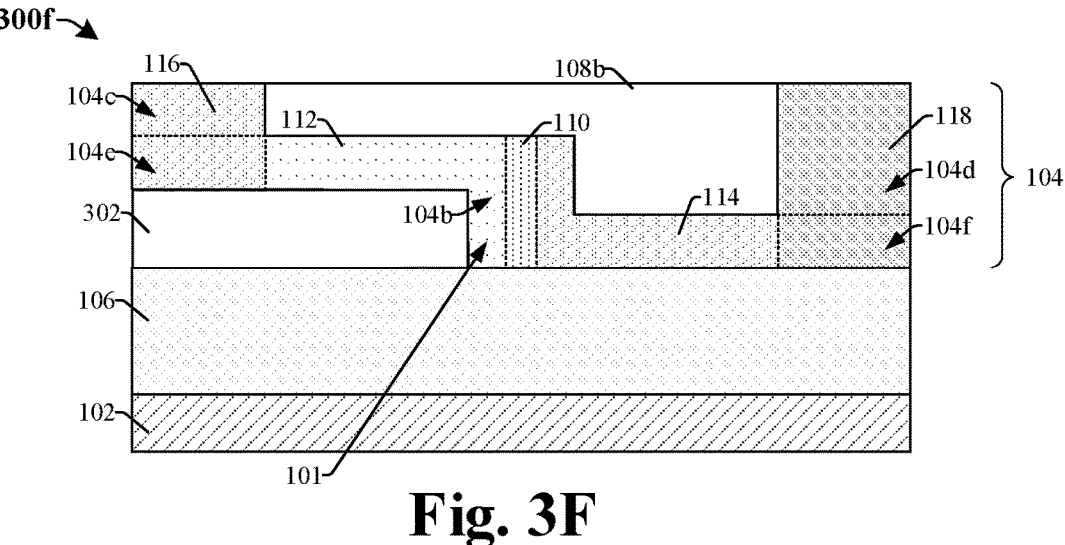

As shown in the cross-sectional view 300f of FIG. 3F, the semiconductor region 110 extends vertically between the first-doping-type region 112 and the second-doping-type region 114. The semiconductor region 110 extends through the center of the ribbed waveguide 104, which coincide with the peak of the electromagnetic field. The depletion region formed at the PIN junction may have a greater cross-sectional area when the semiconductor region 110 extends vertically, thereby increasing the amount of charge carriers that may be generated due to the photoelectric effect.

Figure 3G:
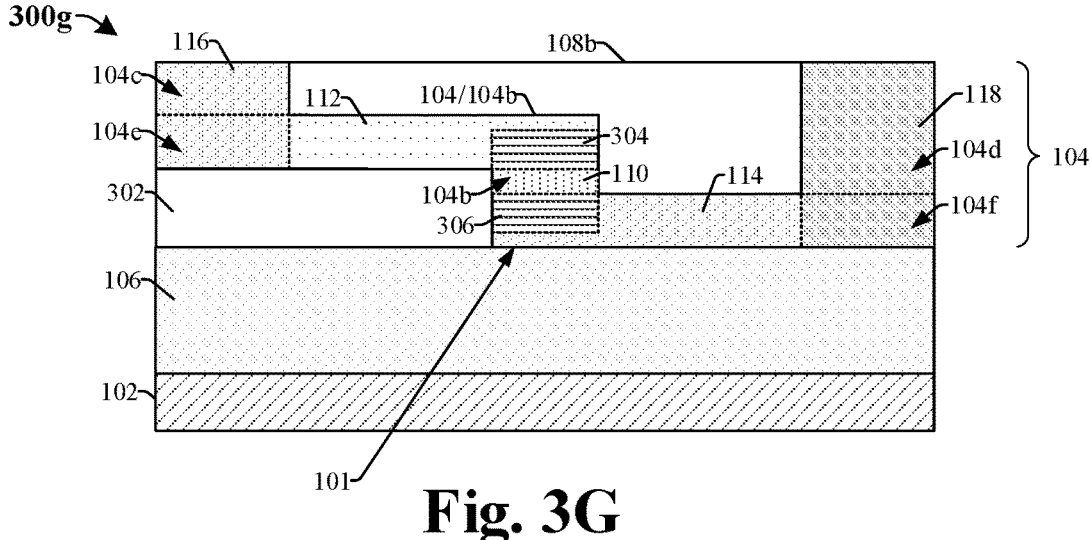

As shown in the cross-sectional view 300*g* of FIG. 3G, the semiconductor region 110 extends horizontally between the first-doping-type region 112 and the second-doping-type region 114, and also overlaps with the first-doping-type region 112 and the second-doping-type region 114 in first-type overlap region 304 and second-type overlap region 306. This overlap results in the semiconductor region 110 covering a wider portion of the depletion region, increasing the efficiency of carrier generation over a larger area while still being positioned at the center of the ribbed waveguide 104.

Figure 3H:
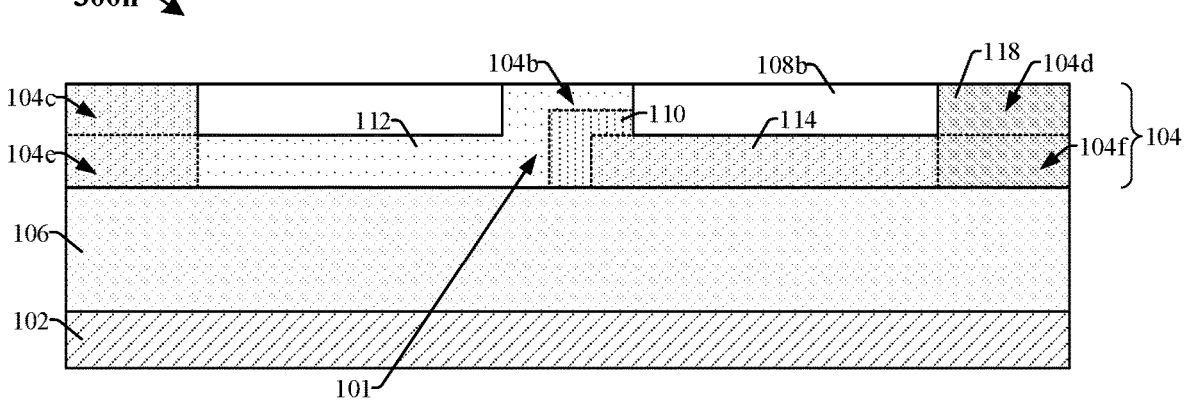

As shown in the cross-sectional view 300*h* of FIG. 3H, the semiconductor region 110 has a lower portion that extends vertically between the first-doping-type region 112 and the second-doping-type region 114 and an upper portion horizontally between the first-doping-type region 112 and the second-doping-type region 114. This configuration has the semiconductor region 110 extending through a center of the ribbed waveguide 104 while further increasing the area of the semiconductor region 110 without overlapping with the first-doping-type region 112 or the second-doping-type region 114. The increased area of the semiconductor region 110 due to the horizontal extension increases the area of the depletion region.

Figure 3I:
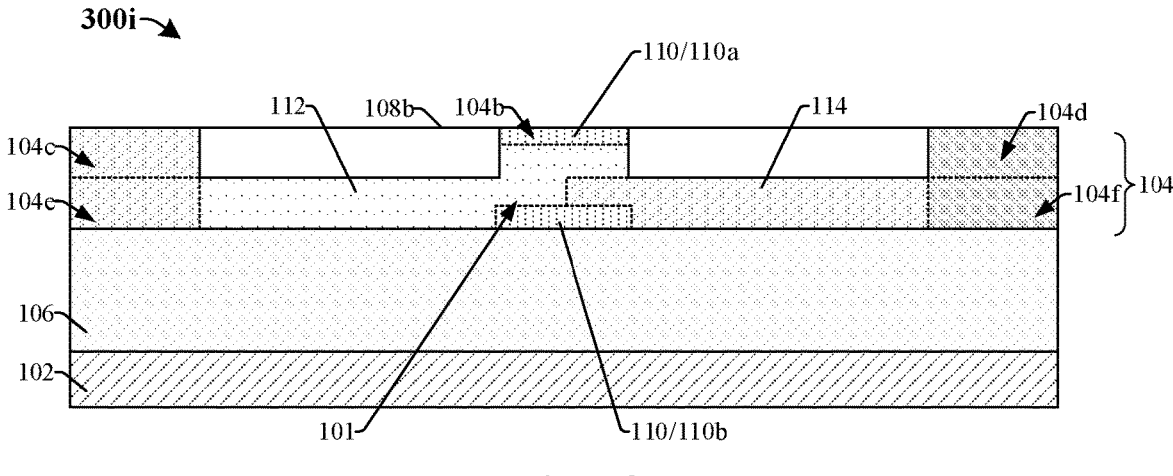

As shown in the cross-sectional view 300*i* of FIG. 3I, a second semiconductor region 110*b* extends beneath a first semiconductor region 110*a* and the PN junction 113. The multiple semiconductor regions 110*a*, 110*b* cover portions of the ribbed waveguide 104 near the center while maintaining a direct PN junction 113 between the first-doping-type region 112 and the second-doping-type region 114. The PN junction 113 extends vertically between the first-doping-type region 112 and the second-doping-type region 114 and horizontally between the first-doping-type region 112 and the second-doping-type region 114, increasing the area of the depletion region near the center of the ribbed waveguide 104.

Figure 3J:
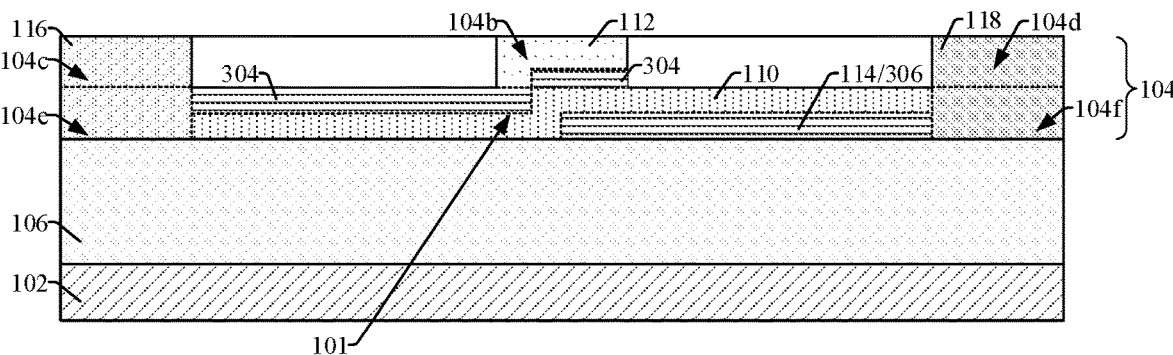

As shown in the cross-sectional view 300*j* of FIG. 3J, the semiconductor region 110 covers portions of the lower slab 104*f* extending from the first protrusion 104*c* to the second protrusion 104*d*. The first-doping-type region 112 extends into the rib 104*b* and over the second-doping-type region 114, overlapping with the semiconductor region 110 at the first-type overlap regions 304. The second-doping-type region 114 extends beneath the rib 104*b*, overlapping with the semiconductor region 110, resulting in the second-type overlap region 306. The semiconductor region 110 has an extended width and a larger horizontal separation between the first-doping-type region 112 and the second-doping-type region 114, which results in a larger depletion region and increased quantum efficiency across the extended depletion region.

Figure 4:
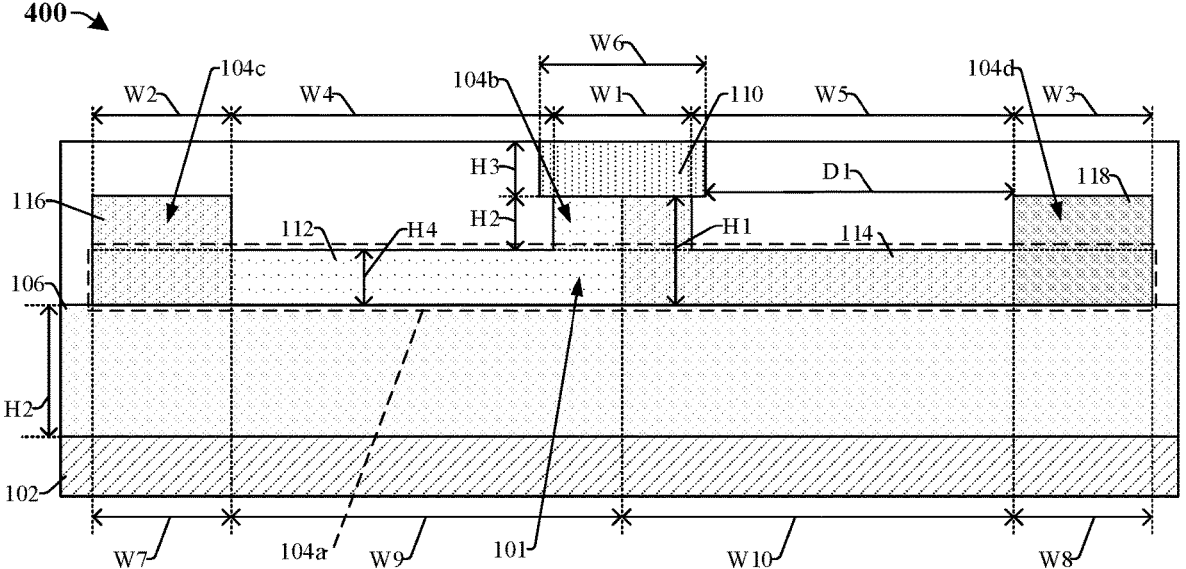
FIG. 4 illustrates a cross-sectional view of the optical module of FIGS. 1A and 1B in which dimensions of the ribbed waveguide are described.

FIG. 4 illustrates a cross-sectional view 400 of the optical module of FIGS. 1A and 1B in which the dimensions of the ribbed waveguide are described.

In some embodiments, the rib 104*b* has a first width W1 approximately between 300 and 2000 nanometers, approximately between 200 and 1500 nanometers, approximately between 400 and 2500 nanometers, or within another suitable range. In some embodiments, the first protrusion 104*c* has a second width W2 approximately between 120 and 200 percent of the first width W1. In some embodiments, the second protrusion 104*d* has a third width W3 approximately between 120 and 200 percent of the first width W1. In some embodiments, a first portion of the slab 104*a* extending between the first protrusion 104*c* and the rib 104*b* has a fourth width W4 approximately between 100 and 200 percent of the first width W1. In some embodiments, a second portion of the slab 104*a* extending between the second protrusion 104*d* and the rib 104*b* has a fifth width W5 approximately between 100 and 200 percent of the first width W1. In some embodiments, a distance D1 between the semiconductor region 110 and the second heavily doped region 118 is approximately between 35 and 99 percent of the fifth width W5. In some embodiments, the semiconductor region 110 has a sixth width W6 approximately between 100 and 350 percent of the first width W1.

In some embodiments, the first heavily doped region 116 has a seventh width W7 approximately between 150 and 230 percent of the first width W1. In some embodiments, the first heavily doped region 116 extends past sidewalls of the first protrusion 104*c*. In some embodiments, the second heavily doped region 118 has an eighth width W8 approximately between 150 and 230 percent of the first width W1. In some embodiments, the second heavily doped region 118 extends past sidewalls of the second protrusion 104*d*. In some embodiments, the first-doping-type region 112 outside of the first heavily doped region 116 has a ninth width W9 approximately between 50 and 100 percent of a combination of the first width W1, the second width W2, and the fourth width W4. In some embodiments, the second-doping-type region 114 outside of the second heavily doped region 118 has a tenth width W10 approximately between 50 and 100 percent of a combination of the first width W1, the second width W2, and the fourth width W4. The first-doping-type region 112 and the first heavily doped region 116 overlap by approximately 100 nanometers, 120 nanometers, 150 nanometers, or the like. The second-doping-type region 114 and the second heavily doped region 118 overlap by approximately 100 nanometers, 120 nanometers, 150 nanometers, or the like.

In some embodiments, the distance from an upper surface of the rib 104*b* to a bottom surface of the slab 104*a* has a first height approximately between 50 and 1000 nanometers, approximately between 40 and 800 nanometers, approximately between 60 and 1200 nanometers, or within another suitable range. In some embodiments, the rib 104*b* has a second height H2 approximately between 10 and 90 percent of the first height H1. In some embodiments, the semiconductor region has a third height H3 approximately between 1 and 50 percent of the second height H2. In some embodiments, the slab 104*a* has a fourth height H4 approximately between 10 and 90 percent of the first height H1. In some embodiments, the insulative layer 106 has a fifth height approximately between 2000 and 5000 nanometers, approximately between 1800 and 4500 nanometers, approximately between 2200 and 5500 nanometers, or within another suitable range.

Figure 5:
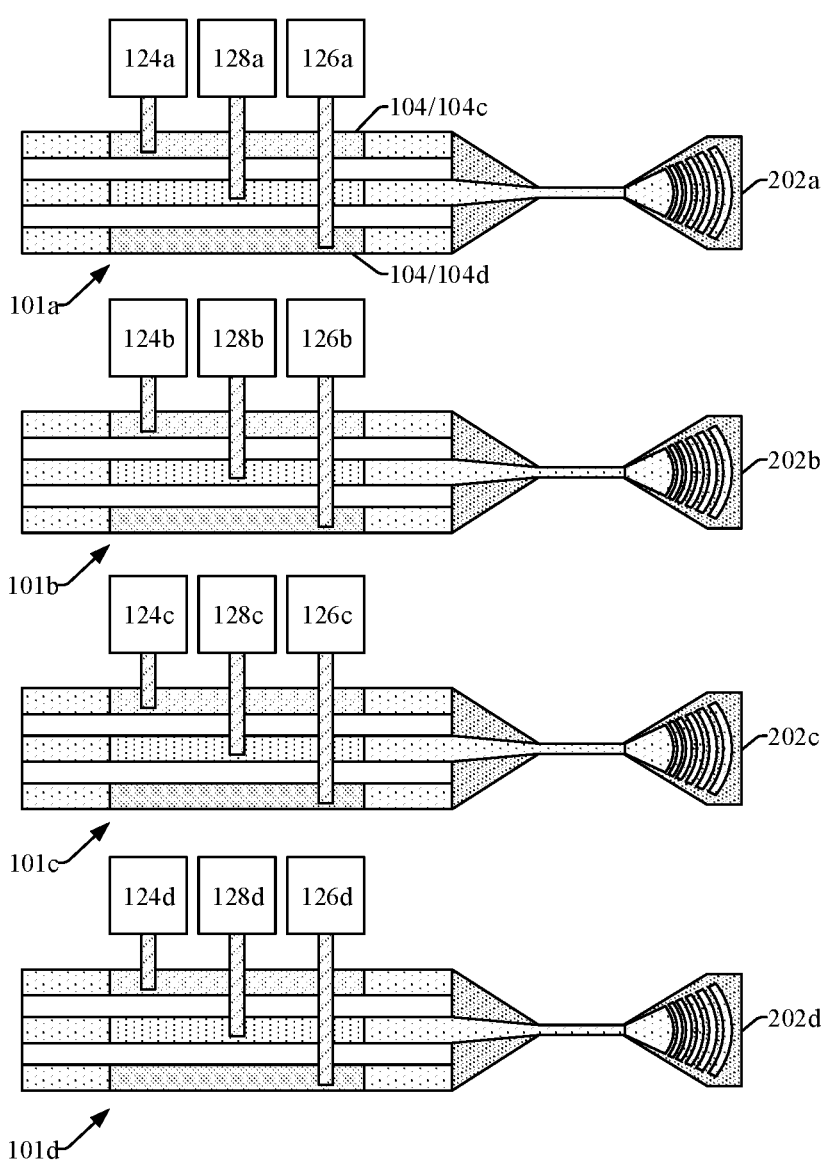
FIG. 5 illustrates a top down view of an array of photodetectors.

FIG. 5 illustrates a top down view 500 of an array of photodetectors.

FIG. 5 shows a plurality of optical couplers 202*a*-202*d* coupled to an array of photodetectors 101*a*-101*d*. The photodetectors 101*a*-101*d* are coupled to a plurality of first pads 124*a*-124*d*, a plurality of second pads 126*a*-126*d*, and a plurality of third pads 128*a*-128*d*. The array of photodetectors 101*a*-101*d* received photonic signals and convert the photonic signals into electric signals. The electric signals are separately delivered to an electronic circuit through the plurality of first pads 124*a*-124*d*, the plurality of second pads 126a-126d, and the plurality of third pads 128a-128d. The photodetectors 101a-101d may, for example, each be as the photodetector 101 is described in any one or combination of the foregoing embodiments.

Figure 6A:
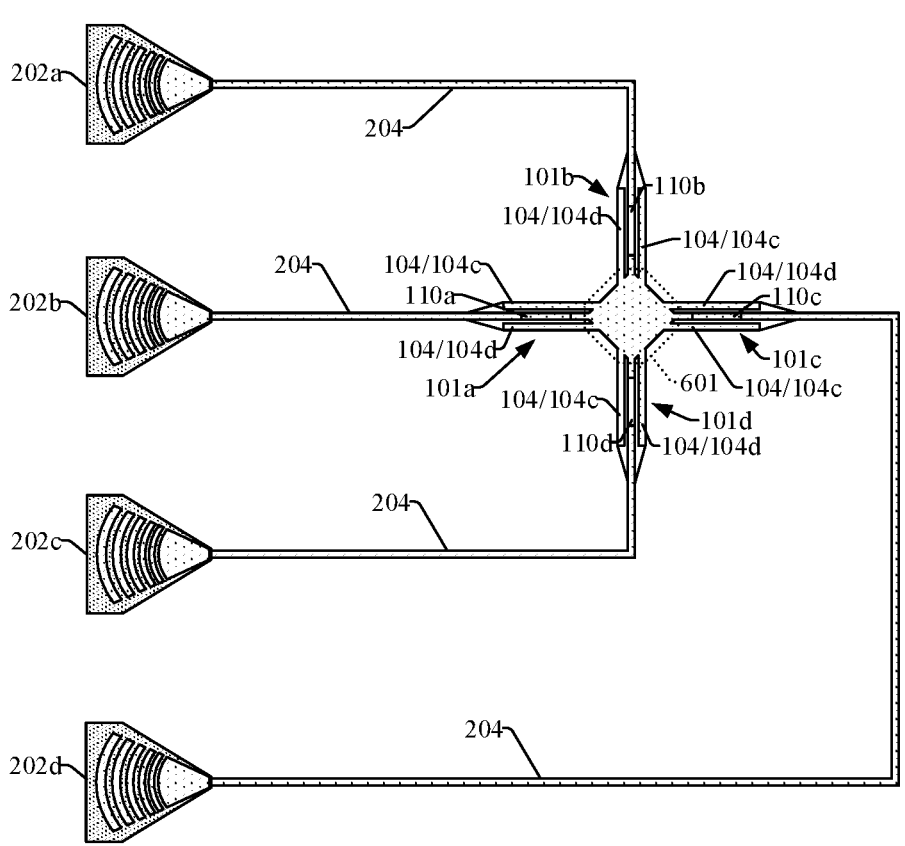
FIG. 6A-6B illustrate top layout views of an array of photodetectors integrated into a photonic circuit.
Figure 6B:
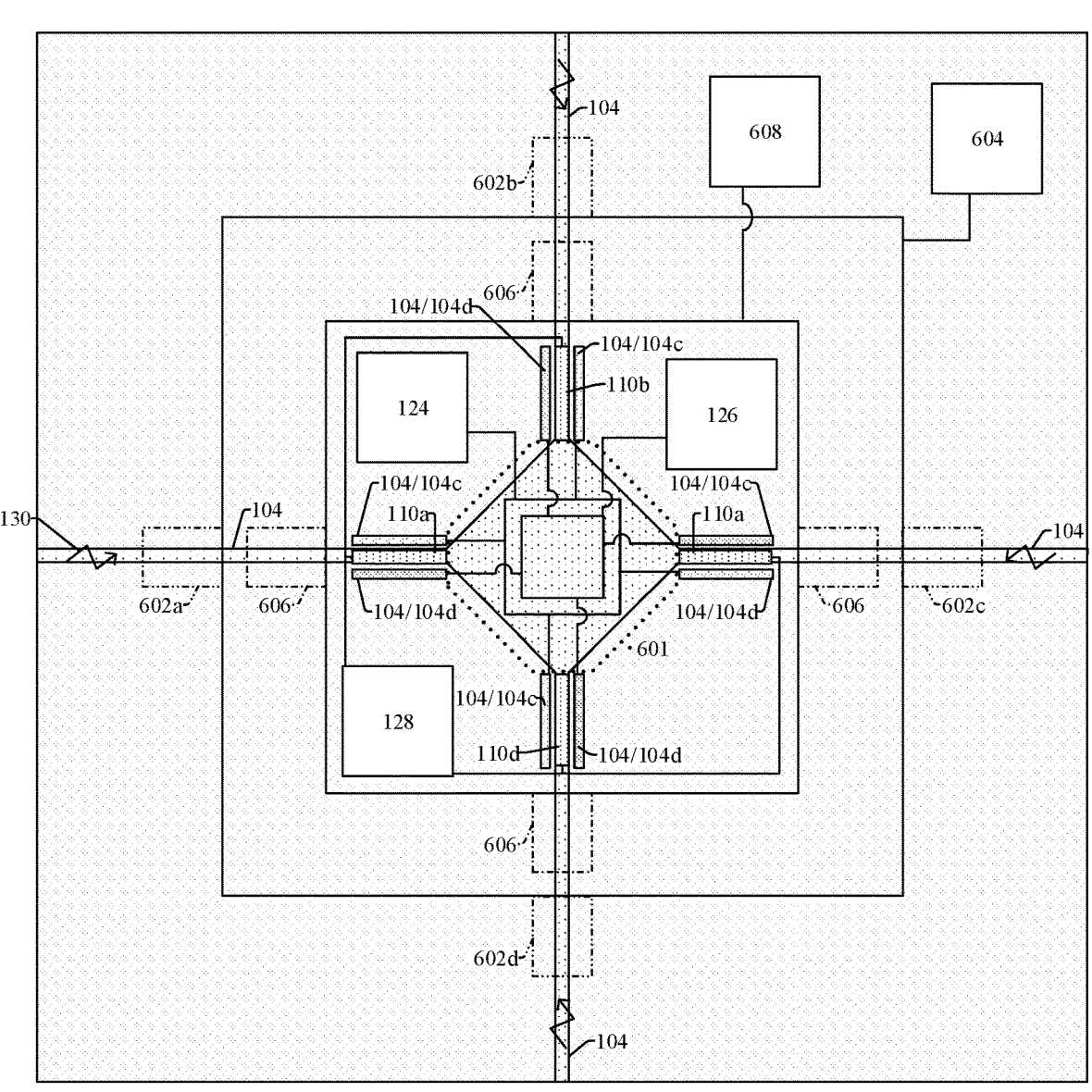

FIGS. 6A-6B illustrate top layout views 600a-600b of an array of photodetectors integrated into a photonic circuit.

FIG. 6A shows a plurality of optical couplers 202a-202d coupled to an array of photodetectors 101a-101d surrounding a central region 601. The photodetectors 101a-101d comprise individual first protrusions 104/104c, second protrusions 104/104d, and semiconductor regions 110a-110d. The photodetectors 101a-101d may, for example, each be as the photodetector 101 is described in any one or combination of the foregoing embodiments.

In some embodiments, the ribbed waveguides 104 extending through the array of photodetectors 101a-101d terminate at the central region 601. The photonic signals that pass through the array of photodetectors 101a-101d may, for example, be absorbed in the central region 601. In some embodiments, the central region 601 has a semiconductor cap (not shown) that is configured to absorb the remainder of the photonic signals in the central region 601.

The central region 601 may have a polygonal shape (e.g., a diamond shape, a pentagon shape, etc.). The photodetectors 101a-101d are evenly spaced around the central region 601. In some embodiments, the photodetectors 101a-101d are coupled to the vertices of the polygonal shape. By coupling the array of photodetectors 101a-101d to the central region 601, the area normally used to absorb the photonic signals output from individual photodetectors in a column array is reduced, increasing the space efficiency of the design. Additionally, embodiments comprising one or more additional photodetectors coupled to the central region 601 will not (or will minimally) increase the area taken by the array, increasing flexibility in the number of photodetectors used and the scalability of the design.

As shown in FIG. 6B, in some embodiments, the individual first protrusions 104/104c and the individual second protrusions 104/104d are connected to a single first pad 124 and a single second pad 126, respectively. In further embodiments, individual semiconductor regions 110a-110d are coupled to a single third pad 128.

Amplitude modulation or frequency modulation may, for example, be used to encode the information from the individual photodetectors 101a-101d into one or more digital signals. In some embodiments, a clock signal is used to add delays to individual output signals from the individual photodetectors 101a-101d, such that each photodetector has a different delay amount. In some embodiments, modulators 602a-602d alter the amplitudes and/or frequencies of the photonic signals 130 to be different from one another. The amplitudes of the photonic signals 130 are proportionate to the output current of the photodetectors 101a-101d, as the number of carriers generated is proportional to the number of photons entering the depletion region. Because the individual first protrusions 104c are coupled to the first pad 124 and because the individual second protrusions 104d are coupled to the second pad 126, the electrical signals from the array of photodetectors 101a-101d may add and/or combine into an output signal.

In some embodiments, the modulators 602a-602d may be coupled to a fourth pad 604. An electric signal from the fourth pad 604 may be used to control the modulators 602a-602d. In some embodiments, attenuators 606 may be coupled to the ribbed waveguides 104 to further control the amplitude of the photonic signals 130. The attenuators 606 may be controlled by signals received from a fifth pad 608.

In some embodiments, the positioning of the plurality of pads 124, 126, 128, 604, and 608 may vary from what is shown in FIG. 6.

Because the individual photodetectors 101a-101d share the same set of pads, space efficiency is enhanced. Less area is wasted on pads. Further, the pitch between photodetectors may be reduced. Accordingly, there may be more photodetectors per given area than would otherwise be possible (e.g., with a layout like that of FIG. 5).

With reference to FIGS. 7-20, a series of views of some embodiments of a method for forming an integrated photodetector with a semiconductor region is provided. Although FIGS. 7 to 20 are described as a series of acts, it will be appreciated that these acts are not limiting in that the order of the acts can be altered in other embodiments, and the methods disclosed are also applicable to other structures. In other embodiments, some acts that are illustrated and/or described may be omitted in whole or in part.

Figure 7:
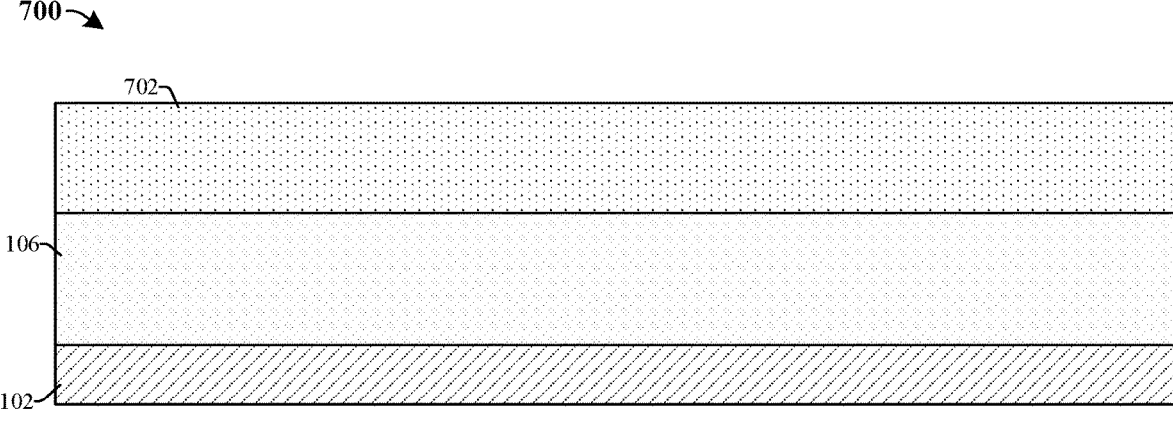
FIGS. 7-20 illustrate a series of cross-sectional views of some embodiments of a method for forming a photodetector integrated with a ribbed waveguide.

As illustrated by a cross-sectional view 700 of FIG. 7, a SOI substrate is provided or otherwise formed. The SOI substrate comprises a handle substrate 102, an insulator layer 106 overlying the handle substrate 102, and a semiconductor layer 702 overlying the insulator layer 106. The semiconductor layer 702 is undoped or otherwise lightly doped. The light doping may, for example, be a doping concentration that is less than about 5e16 atoms/cm$^3$ or some other suitable value.

Figure 8:
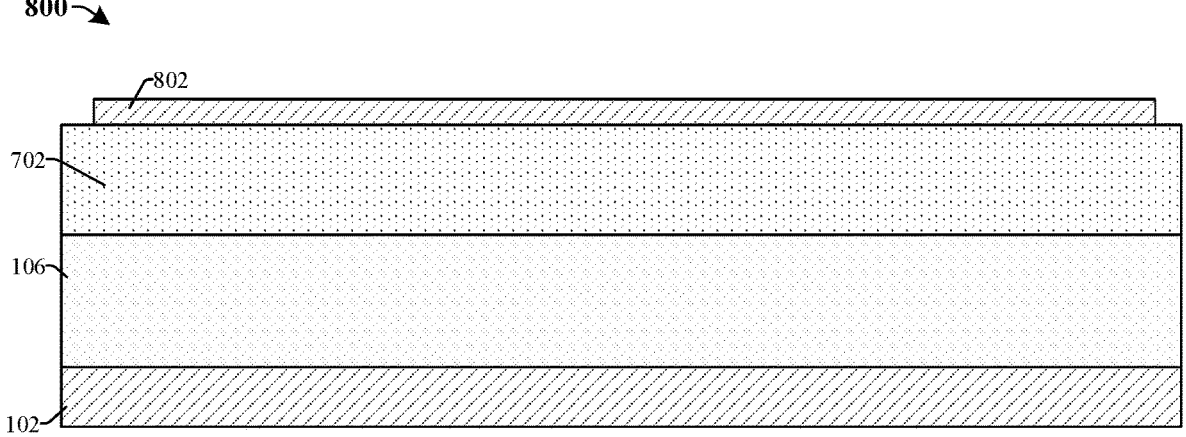

As illustrated by a cross-sectional view 800 of FIG. 8, a first masking layer 802 (e.g., a photoresist) is deposited over the semiconductor layer 702 and patterned. The patterning may, for example, be performed by a photolithography or some other suitable patterning process.

Figure 9:
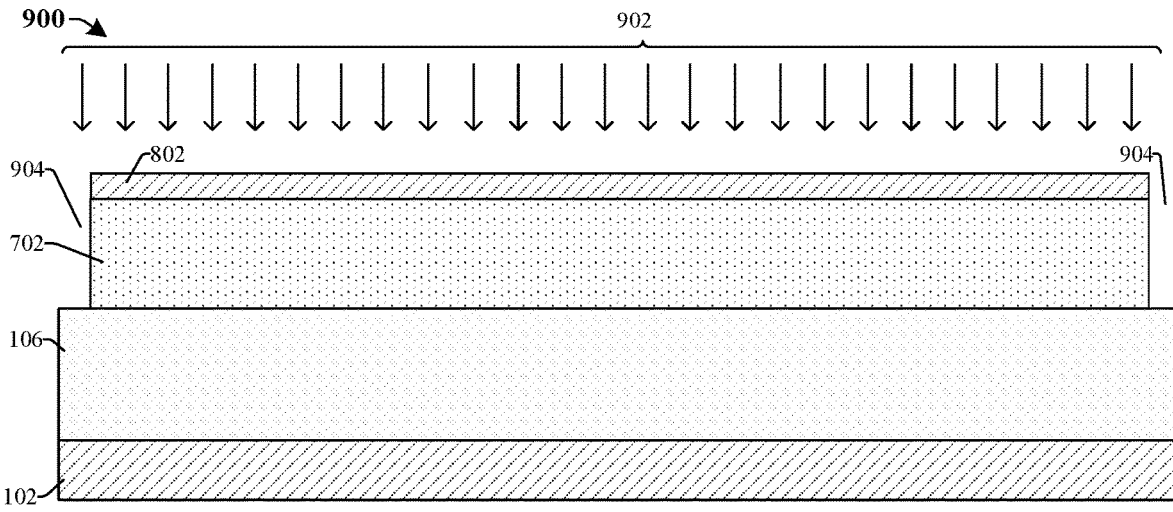

As illustrated by a cross-sectional view 900 of FIG. 9, an etching process 902 is performed, etching first openings 904 in the semiconductor layer 702 according to the first masking layer 802. The etching process may, for example, be a plasma dry etch or some other suitable patterning process. The etching process removes portions of the semiconductor layer 702 surrounding the ribbed waveguide 104 (see FIG. 1A) formed hereafter. The first masking layer 802 is subsequently removed.

Figure 10:
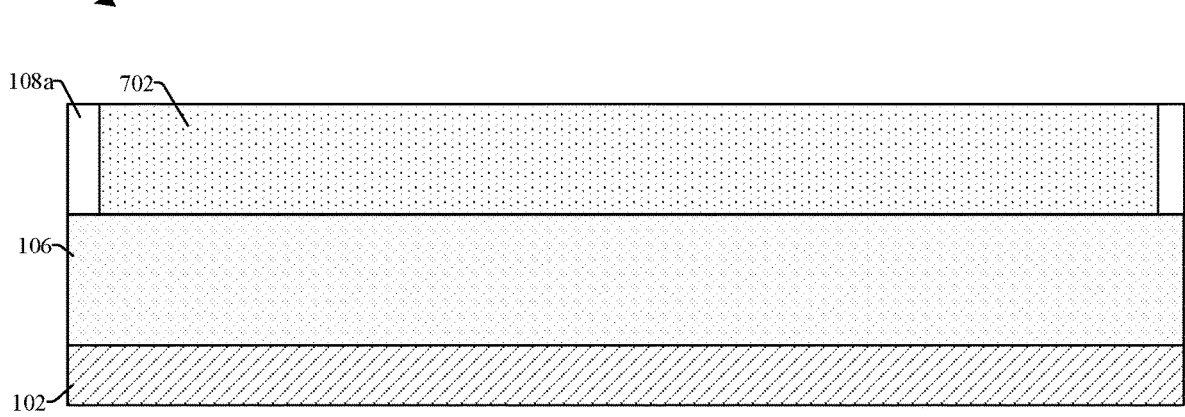

As illustrated by a cross-sectional view 1000 of FIG. 10, the first openings 904 surrounding the semiconductor layer 702 are filled with a first dielectric layer 108a. In some embodiments, the first dielectric layer 108a is formed by depositing a dielectric material over the semiconductor layer 702, then subsequently performing a planarization process (e.g., a chemical mechanical planarization (CMP) process) to remove portions of the dielectric material above the semiconductor layer 702.

Figure 11:
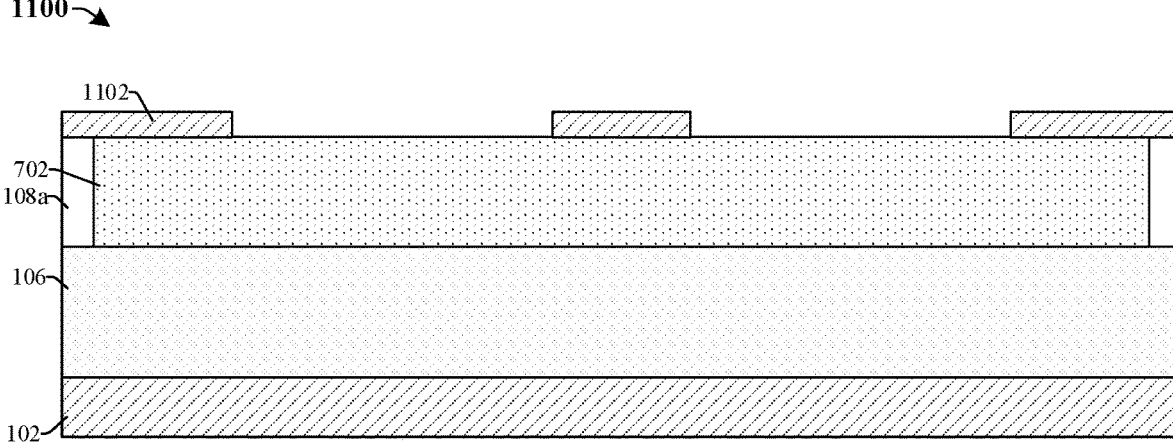

As illustrated by a cross-sectional view 1100 of FIG. 11, a second masking layer 1102 (e.g., a photoresist) is deposited over the semiconductor layer 702 and patterned. The patterning may, for example, be performed by a photolithography or some other suitable patterning process.

Figure 12:
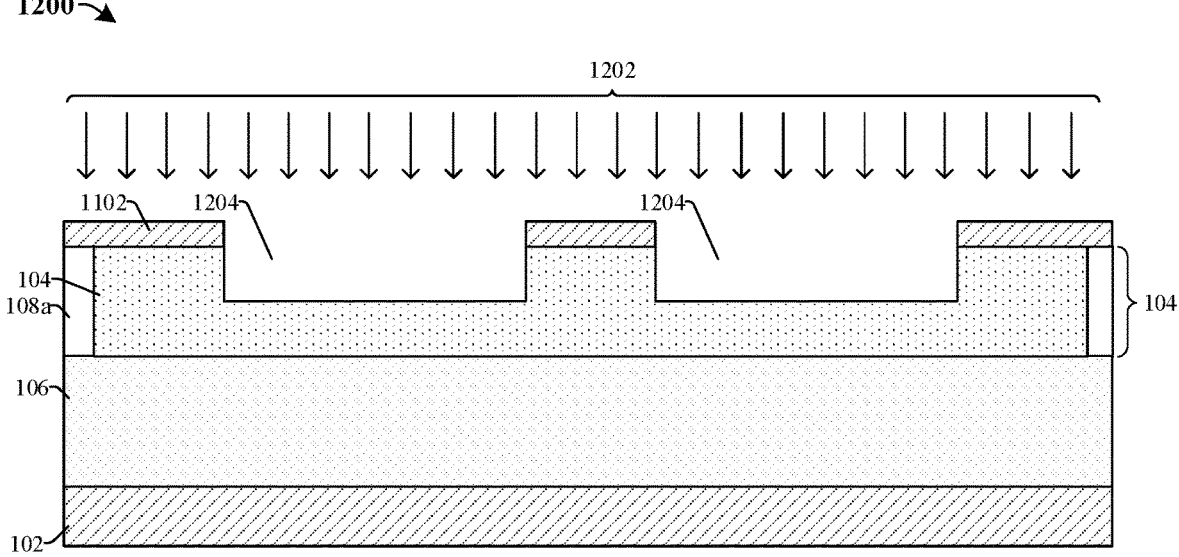

As illustrated by a cross-sectional view 1200 of FIG. 12, an etching process 1202 is performed, etching second openings 1204 in the semiconductor layer 702 (see FIG. 11) according to the second masking layer 1102. The etching process may, for example, be a plasma dry etch or some other suitable patterning process. The etching process exposes inner sidewalls of the ribbed waveguide 104. The second masking layer 1102 is subsequently removed.

Figure 13:
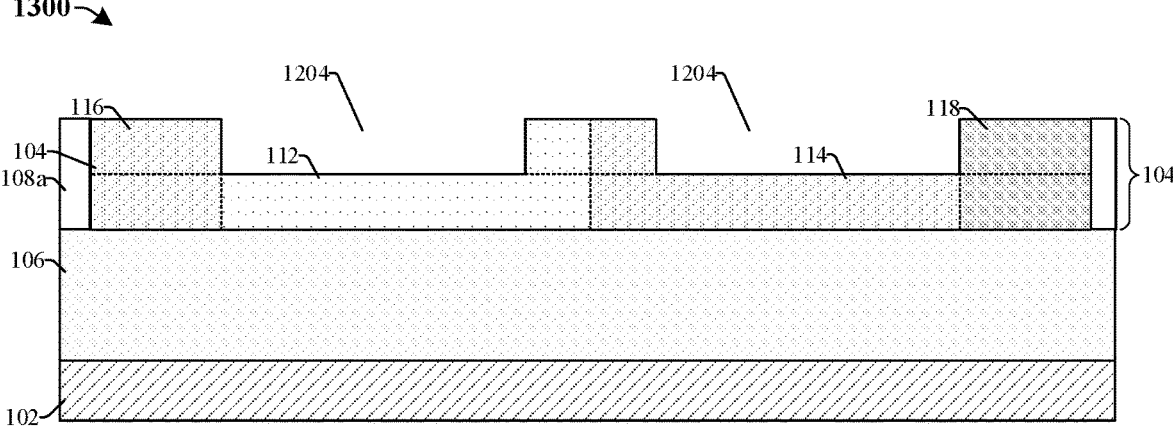

As illustrated by a cross-sectional view 1300 of FIG. 13, the ribbed waveguide 104 is doped, forming the first-doping-type region 112, the second-doping-type region 114, the first heavily doped region 116, and the second heavily doped region 118. In some embodiments, the semiconductor region 110 (see FIGS. 3A, 3B, 3D, 3F, 3G, 3H, 3I, and 3J) is also formed by doping the ribbed waveguide 104. The doping of the ribbed waveguide 104 may be performed by selective ion implantation with a mask in place or by some other suitable doping process. The mask may, for example, be a photoresist mask or a hard mask.

Figure 14:
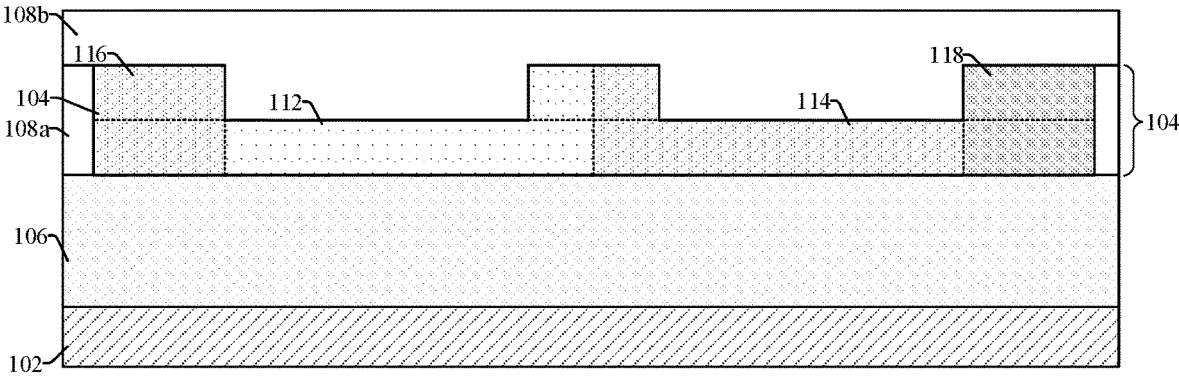

As illustrated by a cross-sectional view 1400 of FIG. 14, a second dielectric layer 108b is formed over the ribbed waveguide 104. In some embodiments, the second dielectric layer 108b is or comprises a dielectric material such as silicon oxide (SiO$_2$) or the like. In some embodiments, the second dielectric layer is formed using chemical vapor deposition (CVD), physical vapor deposition (PVD), atomic layer deposition (ALD), some other suitable deposition process, or a combination of the foregoing.

Figure 15:
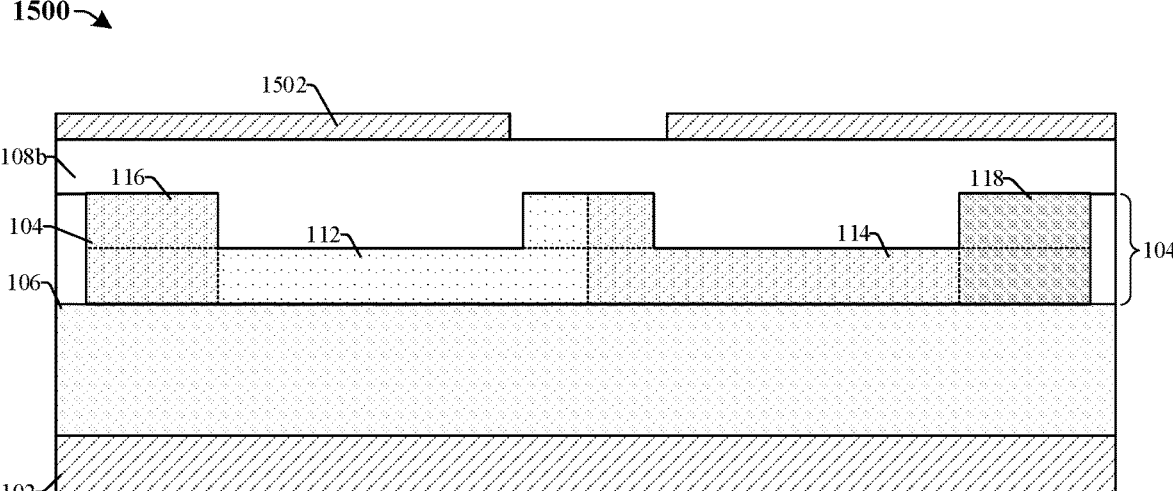

As illustrated by a cross-sectional view 1500 of FIG. 15, a third masking layer 1502 (e.g., a photoresist) is deposited over the second dielectric layer 108b and patterned. The patterning may, for example, be performed by a photolithography or some other suitable patterning process.

Figure 16:
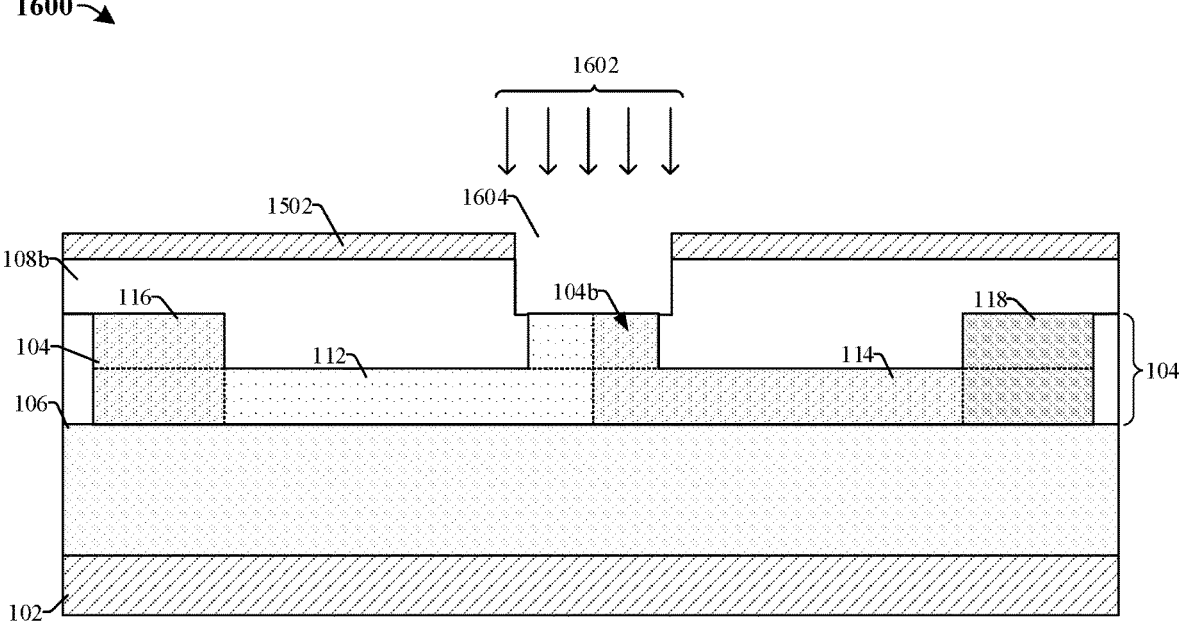

As illustrated by a cross-sectional view 1600 of FIG. 16, an etching process 1602 is performed, etching third openings 1604 in the second dielectric layer 108b according to the third masking layer 1502. The etching process may, for example, be a plasma dry etch or some other suitable patterning process. The etching process exposes an upper surface of the rib 104b of the ribbed waveguide 104. The second masking layer 1102 is subsequently removed.

Figure 17:
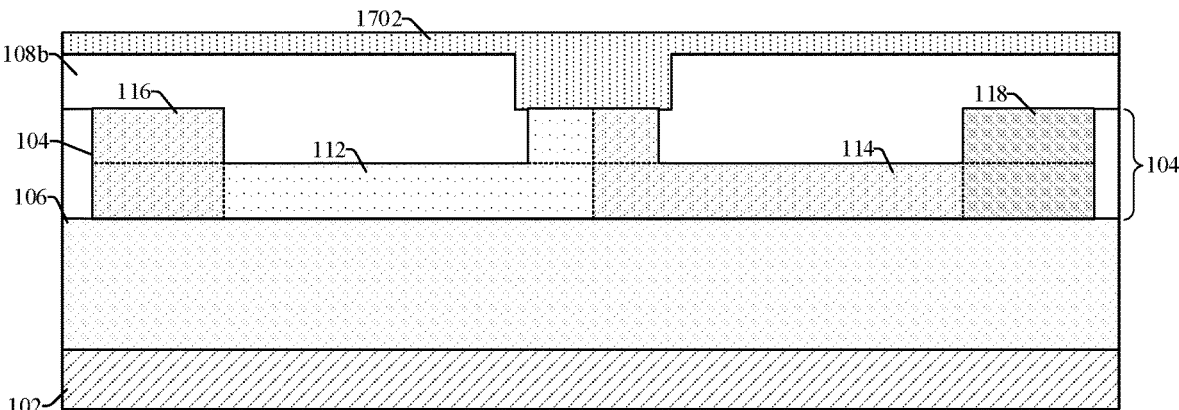

As illustrated by a cross-sectional view 1700 of FIG. 17, in some embodiments, a second semiconductor layer 1702 is deposited over the ribbed waveguide 104 and the second dielectric layer 108b. The second semiconductor layer 1702 is or comprises a second semiconductor material, such as germanium (Ge), or a III-V semiconductor material, such as gallium arsenide (GaAs), indium arsenide (InAs), gallium nitride (GaN), indium phosphide (InP), or the like. The second semiconductor layer 1702 fills the third opening 1604.

Figure 18:
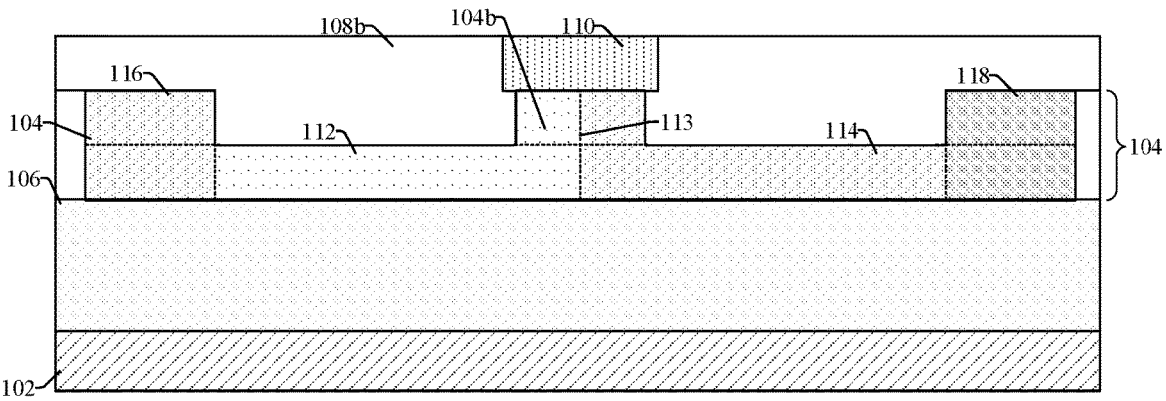
Figure 19:
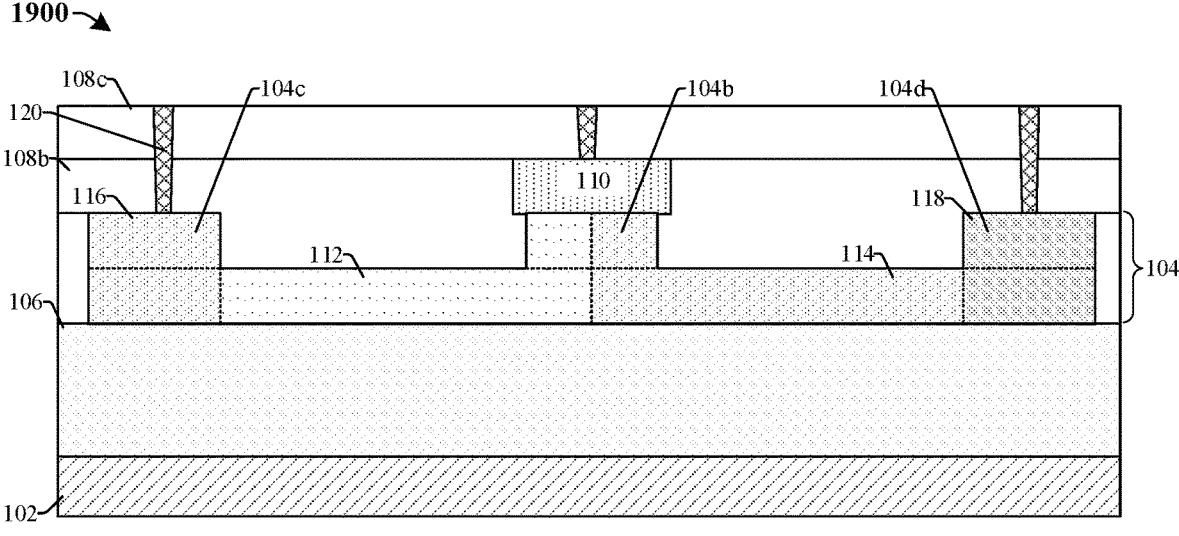

As illustrated by a cross-sectional view 1800 of FIG. 18, portions of the second semiconductor layer 1702 (see FIG. 17) above the second dielectric layer 108b are removed, leaving the semiconductor region 110 on the ribbed waveguide 104. In some embodiments, the portions are removed using a planarization process (e.g., a CMP process). The semiconductor region 110 is positioned directly above the rib 104b and the PN junction 113, As illustrated by a cross-sectional view 1900 of FIG. 19, a third dielectric layer 108c is formed over the second dielectric layer 108b and the semiconductor region 110. Contacts 120 are subsequently formed. The contacts 120 extend through a third dielectric layer 108c and the second dielectric layer 108b, and are coupled to the semiconductor region 110, the first protrusion 104c, and the second protrusion 104d. In embodiments where the semiconductor region 110 is implanted (see FIGS. 3B, 3D, 3F, 3G, 3H, 3I, and 3J) instead of deposited (see FIGS. 3A, 3C, 3E), the contacts 120 are either coupled to the implanted semiconductor region 110 in the ribbed waveguide 104 or are not coupled to the ribbed waveguide 104 beyond the first and second protrusions 104c. 104d.

Figure 20:
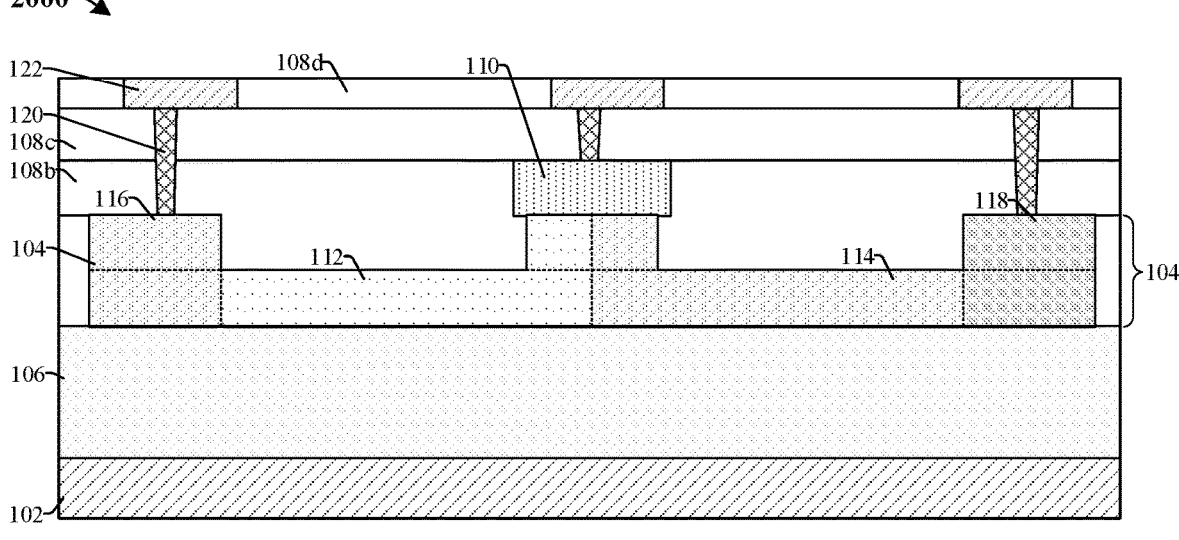

As illustrated by a cross-sectional view 2000 of FIG. 20, a wire layer 122 is formed over the contacts 120 is a fourth dielectric layer 108d. The wire layer 122 is coupled to the contacts 120 and carries the electrical signal from the photodetector 101 to the first and second pads 124, 126 (see FIG. 1B).

With reference to FIG. 21, a block diagram 2100 of some embodiments of the method of FIGS. 7-20 is provided.

At 2102, a semiconductor layer is patterned to form a first waveguide on a substrate. See, for example, FIGS. 11 and 12.

At 2104, the first waveguide is doped to form a first PN junction. See, for example, FIG. 13.

At 2106, a first semiconductor region is formed on the first PN junction using one or both of an implantation process and a deposition process, wherein the semiconductor layer comprises a first semiconductor material and the first semiconductor region comprises a second semiconductor material different from the first semiconductor material. See, for example, FIGS. 16-18.

While the block diagram 2100 of FIG. 21 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

In some embodiments, the present disclosure provides an optical module, including: a waveguide including a rib and further including a first protrusion and a second protrusion respectively on opposite sides of the rib; a photodetector comprising a PN junction in the rib; and a semiconductor region on the PN junction, where the waveguide comprises a first semiconductor material, and the semiconductor region comprises a second semiconductor material different from the first semiconductor material.

In some embodiments, the present disclosure provides another optical module, including: waveguides arranged around and ending at a central region; photodetectors integrated into the waveguides around the central region; a first pad coupled to N-type regions of the photodetectors; and a second pad coupled to P-type regions of the photodetectors.

In some embodiments, the present disclosure provides a method for forming an optical module, including: patterning a semiconductor layer to form a first waveguide in the semiconductor layer; doping the first waveguide to form a first PN junction; forming a first semiconductor region on the first PN junction using one of an implantation process or a deposition process, wherein the semiconductor layer comprises a first semiconductor material and the first semiconductor region comprises a second semiconductor material different from the first semiconductor material.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical module, comprising:
a waveguide comprising a rib and further comprising a first protrusion and a second protrusion respectively on opposite sides of the rib;
a PN junction between the first protrusion and the second protrusion; and
a semiconductor region of the waveguide on the PN junction, wherein the waveguide comprises a first semiconductor material, and the semiconductor region comprises a second semiconductor material different from the first semiconductor material, wherein the semiconductor region has a first width within the rib of the waveguide and has a second width beneath the rib of the waveguide, and wherein the second width is greater than the first width.

2. The optical module of claim 1, wherein the first semiconductor material comprises silicon and the second semiconductor material comprises germanium or a III-V semiconductor material.

3. The optical module of claim 1, wherein a position of the semiconductor region substantially coincides with a position in the waveguide which is at both a width-wise center of the waveguide and a height-wise center of the waveguide from a cross-sectional perspective.

4. The optical module of claim 1, further comprising a second waveguide comprising a second rib, a third protrusion, and a fourth protrusion respectively on opposite sides of the rib; and
a central region comprising a semiconductor material at a first end of the waveguide and at a second end of the second waveguide, the central region having a polygonal profile from a top-down view.

5. The optical module of claim 1, wherein the waveguide comprises a slab extending beneath the first protrusion and the second protrusion, and wherein the rib extends from the slab directly between the first protrusion and the second protrusion.

6. The optical module of claim 5, wherein the semiconductor region extends past outer sidewalls of the rib in a lateral direction and extends into the slab in a vertical direction.

7. The optical module of claim 5, wherein the semiconductor region is in the rib and extends into the slab of the waveguide with an inverted T-shaped profile.

8. The optical module of claim 1, further comprising a P-type region and an N-type region forming the PN junction, wherein the P-type region and the N-type region meet directly beneath the semiconductor region.

9. The optical module of claim 8, wherein the P-type region comprises a first heavily doped region with a first dopant concentration and a first lightly doped region with a second dopant concentration less than the first dopant concentration, and wherein the first heavily doped region extends from a top of the first protrusion to beneath the first protrusion.

10. An optical module, comprising:
a central region having a polygonal profile from a top-down view;
waveguides surrounding the central region and ending at the central region, wherein the waveguides end at vertices of the polygonal profile of the central region and contact the vertices of the polygonal profile from a plurality of different directions;
photodetectors integrated into the waveguides surrounding the central region;

a first pad coupled to N-type regions of the photodetectors; and
a second pad coupled to P-type regions of the photodetectors.

11. The optical module of claim 10, further comprising:
amplitude modulators integrated into the waveguides; and
a third pad coupled to the amplitude modulators.

12. The optical module of claim 10, further comprising:
attenuators integrated into the waveguides; and
a third pad coupled to the attenuators.

13. The optical module of claim 10, further comprising:
semiconductor regions in the photodetectors, wherein the waveguides comprise a first semiconductor material and the semiconductor regions comprise a second semiconductor material different from the first semiconductor material; and
a third pad coupled to the semiconductor regions.

14. An integrated device, comprising:
a first photodetector over a substrate and comprising a first central rib extending in a first direction and first peripheral ribs extending in the first direction and spaced from the first central rib in a second direction perpendicular to the first direction;
a first optical coupler coupled to the first photodetector by a first strip waveguide;
a second photodetector over the substrate and comprising a second central rib extending in a third direction different from the first direction and second peripheral ribs extending in the third direction and spaced from the second central rib in a fourth direction perpendicular to the third direction;
a second optical coupler coupled to the second photodetector by a second strip waveguide; and
a central region comprising a semiconductor material and coupled to the first photodetector and the second photodetector, wherein the central region and the first strip waveguide are at opposite ends of the first photodetector and wherein the central region and the second strip waveguide are at opposite ends of the second photodetector.

15. The integrated device of claim 14, wherein the first photodetector is spaced from the second photodetector by the central region.

16. The integrated device of claim 14, further comprising a plurality of additional photodetectors coupled to the central region, wherein the first photodetector, the second photodetector, and the plurality of additional photodetectors are equidistantly spaced around the central region.

17. The integrated device of claim 14, wherein the central region has a polygonal shape from a top-down perspective, and wherein the first photodetector and the second photodetector are coupled to vertices of the polygonal shape.

18. The integrated device of claim 14, wherein the central region further comprises a semiconductor cap and is configured to absorb photonic signals that pass through the first photodetector and the second photodetector.

19. The integrated device of claim 14, wherein the third direction is parallel to the second direction, and the fourth direction is parallel to the first direction.

20. The integrated device of claim 14, wherein the central region further comprises a sidewall extending from the first photodetector to the second photodetector, and wherein the sidewall extends in a fifth direction different from the first direction, the second direction, the third direction, and the fourth direction.

* * * * *